United States Patent
Vandike et al.

(10) Patent No.: US 11,140,824 B2
(45) Date of Patent: Oct. 12, 2021

(54) AGRICULTURAL HARVESTER BIOMASS ESTIMATING SYSTEM

(71) Applicant: Deere & Company, Moline, IL (US)

(72) Inventors: Nathan R. Vandike, Geneseo, IL (US); Brian J. Gilmore, Davenport, IA (US)

(73) Assignee: DEERE & COMPANY, Moline, IL (US)

(*) Notice: Subject to any disclaimer, the term of this patent is extended or adjusted under 35 U.S.C. 154(b) by 306 days.

(21) Appl. No.: 16/174,935

(22) Filed: Oct. 30, 2018

(65) Prior Publication Data
US 2020/0128731 A1 Apr. 30, 2020

(51) Int. Cl.
| A01D 41/127 | (2006.01) |
| G01S 13/89 | (2006.01) |
| G01S 17/89 | (2020.01) |
| G06T 7/00 | (2017.01) |

(52) U.S. Cl.
CPC .......... *A01D 41/127* (2013.01); *G01S 13/89* (2013.01); *G01S 17/89* (2013.01); *G06T 7/0004* (2013.01); *G06T 2207/30188* (2013.01); *G06T 2207/30252* (2013.01)

(58) Field of Classification Search
CPC ... A01B 69/001; A01B 69/008; A01B 79/005; A01D 41/127; A01D 41/1271; A01D 41/1272; G06K 9/00; G06K 9/00791; G06K 9/00664; G06K 9/00805; G01S 13/89; G01S 17/89; G06T 7/0004
USPC ............. 56/10.2 A–10.2 G, 10.2 R; 460/1–7; 701/50
See application file for complete search history.

(56) References Cited

U.S. PATENT DOCUMENTS

| 6,615,570 B2 | 9/2003 | Beck et al. |
| 9,775,290 B2 | 10/2017 | Schleusner et al. |
| 10,091,932 B2* | 10/2018 | Neitemeier ............. G01F 11/24 |
| 2014/0230391 A1 | 8/2014 | Hendrickson et al. |
| 2016/0003656 A1 | 1/2016 | Gelinske et al. |
| 2018/0084708 A1* | 3/2018 | Neitemeier ........ G06K 9/00664 |

FOREIGN PATENT DOCUMENTS

| EP | 3299995 A1 | 3/2018 |
| WO | 2007050192 A2 | 5/2007 |
| WO | 2011063814 A1 | 6/2011 |
| WO | 2014093794 A1 | 6/2014 |

OTHER PUBLICATIONS

European Search Report issued in counterpart European Patent Application No. 19205845.1 dated Mar. 18, 2020 (8 pages).

* cited by examiner

*Primary Examiner* — Adam J Behrens
(74) *Attorney, Agent, or Firm* — Taft Stettinius & Hollister LLP; Stephen F. Rost

(57) ABSTRACT

A biomass estimating system for an agricultural harvester includes a sensor arrangement disposed to sense standing crop adjacent to the agricultural harvester and disposed to sense a portion of ground adjacent to the agricultural harvester that has been previously harvested. An ECU receives signals indicating the standing crop and signals indicating the portion of the ground and calculates an estimated biomass of the standing crop based at least upon the signals indicating the standing crop and the signals indicating the portion of ground.

17 Claims, 6 Drawing Sheets

AGRICULTURAL HARVESTER BIOMASS ESTIMATING SYSTEM

FIELD OF THE INVENTION

This invention relates generally to agricultural combines. In particular, it relates to systems for estimating biomass to be harvested and controlling combine machine settings responsibly

BACKGROUND OF THE INVENTION

Agricultural harvesters such as combines or windrowers, travel through fields of agricultural crop harvesting the crop. In one common arrangement, agricultural harvesting heads extend forward from the spreading mechanism agricultural harvester to engage the plant stalks, sever them, and carry the severed crop into the body of the agricultural harvester itself for further processing.

A common problem when harvesting agricultural crops is appropriately setting various machine processing parameters to accommodate the amount and type of crop material being harvested. A particular problem for harvesting includes how to change agricultural harvester settings (i.e. settings of material processing mechanisms) to accommodate the changing mass and volume of crop material to be processed. Some portions of a field may have a high volume and therefore high flow rate of cut crop material (biomass) to be processed. Other portions of the field may have a much smaller volume. As the volume changes, the machine settings must be changed in order to efficiently process the crops. These changes do not have instantly, however. They take time. Whenever machine settings are changed, it may take up to a minute for these changes to take effect throughout the combine.

In order to accommodate these differing volumes of biomass it is beneficial to estimate the amount of biomass before the crop is actually cut in order to permit the combine to make the proper changes.

U.S. Pat. No. 9,775,290 B2 discloses a system for estimating biomass using remote sensors that point forward from the front of the agricultural harvester into an approaching stand of crop. In an alternative arrangement (FIG. 6C) a camera/sensor is shown that points sideways into an existing stand of crop adjacent to the agricultural harvester. This arrangement permits the agricultural harvester to estimate the amount of biomass it should harvest several seconds before harvesting.

One drawback with this arrangement is the inability to determine the height of the ground from which the standing crop is growing. The biomass is the amount of crop material that is growing above the ground. If the agricultural harvester is on a concave or convex portion of the field, or if the agricultural harvester is rolling from side to side, the sensed top of the biomass in the field of view of the sensor will move up and down. This leads to inaccurate estimation of the amount of biomass to be harvested.

What is proposed is more accurate estimation of biomass by providing a sensor arrangement that senses the top of the biomass and the harvested ground adjacent to the biomass (the "ground plane") in order to more accurately estimate the amount of biomass to be harvested by the agricultural harvester.

It is an object of this invention to provide such a biomass estimating system. It is also an object of this invention to provide an agricultural harvester with such a biomass estimating system

SUMMARY OF THE INVENTION

In accordance with a first aspect of the invention, a biomass estimating system for an agricultural harvesting vehicle that is operable in an agricultural field to harvest crops is provided, the biomass estimating system comprising: a sensor arrangement directed laterally away from the side of the agricultural harvesting vehicle in a direction generally transverse to the direction of travel, wherein a stand of crop adjacent to the agricultural harvesting vehicle is within the field of view of the at least a first sensor, and wherein a portion of the ground previously harvested crop is also within the field of view; and an ECU coupled to the sensor arrangement, wherein the ECU is configured to receive signals indicating the stand of crop and the portion of the ground previously harvested, wherein the ECU is configured to calculate an estimated biomass for a portion of ground adjacent to the agricultural harvesting vehicle and having a stand of crop based upon at least signals received from the stand of crop, and signals received from the portion of ground previously harvested.

The sensor arrangement may have a first sensor that generates signals indicating the stand of crop and the portion of the ground previously harvested.

The sensor arrangement may have a second sensor coupled to the ECU that generates signals indicating the stand of crop, and a third sensor coupled to the ECU that generates signals indicating the portion of ground previously harvested.

The biomass estimating system may be fixed to an upper portion of the agricultural harvesting vehicle.

The ECU may be configured to store the estimated biomass for the portion of ground adjacent to the agricultural harvesting vehicle in association with a location in the agricultural field of the portion of ground adjacent to the agricultural harvesting vehicle.

The ECU may be coupled to a navigation receiver to receive signals therefrom and to determine a location of the agricultural harvesting vehicle in the agricultural field.

The ECU may be configured to retrieve the previously stored estimated biomass when the navigation receiver indicates that the agricultural harvesting vehicle is facing the previously stored location in the agricultural field.

The ECU may be configured to calculate machine settings of the agricultural harvesting vehicle based at least upon the retrieved previously stored estimated biomass and to apply those machine settings to the agricultural harvesting vehicle.

The machine settings may include a header height, a rotor speed, a cleaning fan speed, an adjustable screen setting, a straw chopper speed, a position of a stationary knife bank with respect to a straw chopper and a ground speed of the agricultural combine.

DETAILED DESCRIPTION OF THE PREFERRED EMBODIMENTS

Figure 1:
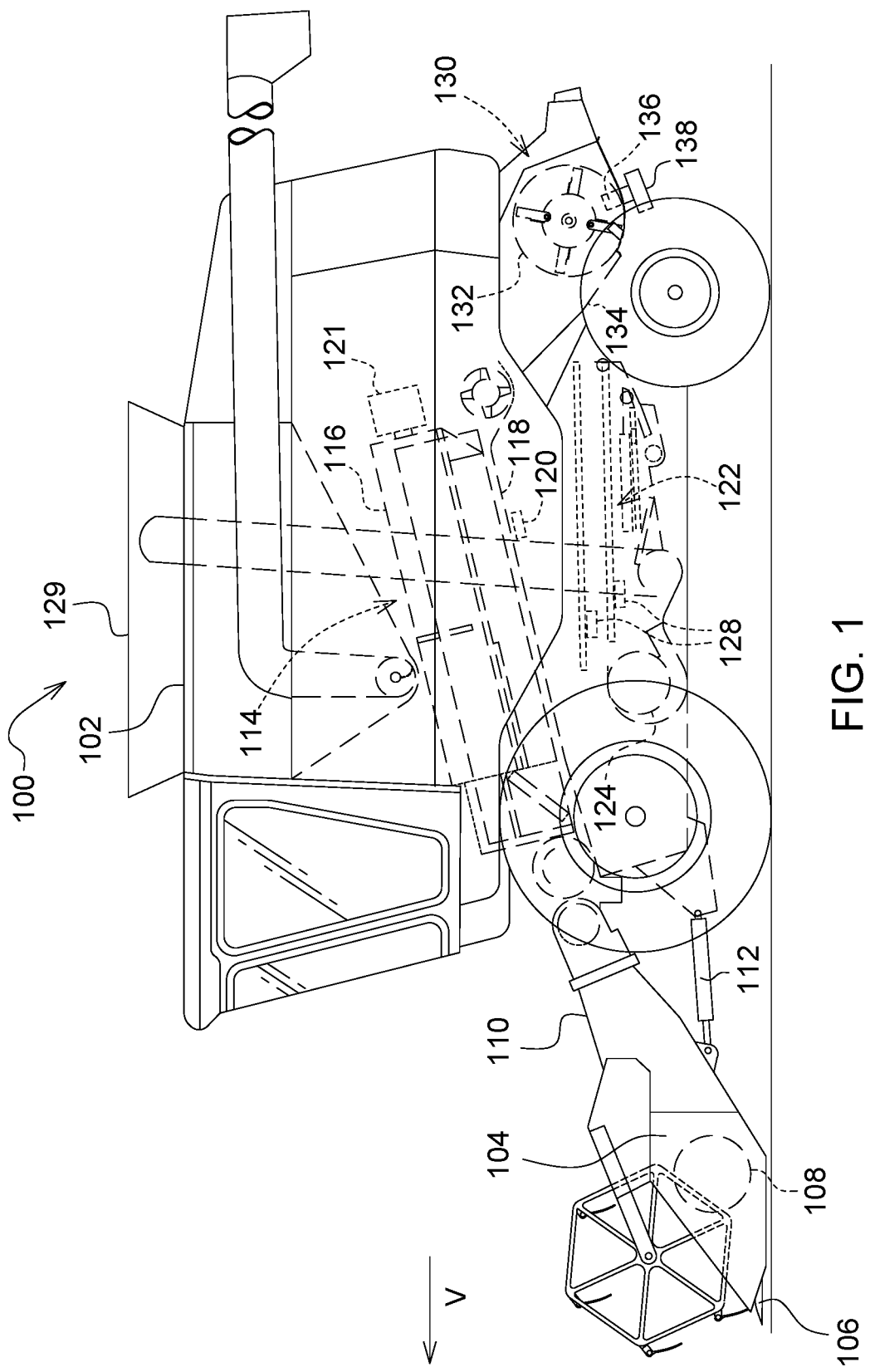
FIG. 1 is a side view of an agricultural harvester with a biomass estimating system in accordance with the present invention.

In FIG. 1 an agricultural harvester 100 is shown comprising a self-propelled agricultural harvesting vehicle 102 and an agricultural harvesting head 104 supported on the front of the agricultural harvesting vehicle 102.

A reciprocating knife 106 on the front of the agricultural harvesting head 104 severs the crop material from the ground. A conveyor system 108 on the agricultural harvesting head 104 carries cut crop material rearward to an inclined conveyor in a feederhouse 110. The inclined conveyor carries the cut crop material rearward and upward into the agricultural harvesting vehicle 102 for further processing.

The feederhouse 110 is pivotally coupled to the front of the agricultural harvesting vehicle 102 such that it can pivot up and down, thereby lifting and lowering the agricultural harvesting head 104 above the ground. Actuators 112 (here shown as hydraulic cylinders) are coupled to the feederhouse 110 and to the agricultural harvesting vehicle 102 to raise and lower the agricultural harvesting head 104 by extending and retracting.

The agricultural harvesting vehicle 102 includes a threshing and separating mechanism 114 that is disposed to receive the cut crop material from the feederhouse and to thresh the cut crop material and separate the cut crop material into the crop itself (grain or seed) from the material other than grain (MOG).

The threshing and separating mechanism 114 includes a cylindrical rotor 116 that is disposed inside a concave grating 118. The cut crop material is introduced into a gap provided between the rotor and the grating. The relative movement of the rotor and the grating because the cut crop material to be threshed and to be separated. The crop itself falls through apertures in the grating and the MOG is retained within the gap and carried away.

An actuator 120 (here shown as a linear actuator) is coupled to the grating to move the grating up and down thereby changing the size of the gap between the rotor and the grating.

A variable speed drive 121 is coupled to the cylindrical rotor 116 to drive the rotor 116 in rotation at a selectable speed.

The crop (grain/seed) falls into a cleaning mechanism 122 for cleaning. The cleaning mechanism 122 includes adjustable screens 124 (also called "sieves" or "chaffers") under which the crop falls. The cleaning mechanism 122 also includes a cleaning fan 126 that generates a flow of air that passes upward through the adjustable screens 124 to lift up light particles mixed with the crop and carry them rearwardly and out of the agricultural harvesting vehicle 102. The crop itself falls through apertures in the adjustable screens 124 into the bottom of the combine.

The speed of the cleaning fan 126 is adjustable to vary the volume of air driven upward through the adjustable screens 124.

Each of the adjustable screens 124 has an actuator 128 that adjusts the spacing and angle of slats in the screens themselves to thereby control the flow of air through the screens.

Crop falling to the bottom of the combine is carried upward into a storage space 129 (also called a "grain tank") for later offloading from the agricultural harvesting vehicle 102.

The material other than grain (MOG) is carried to the rear of the agricultural harvesting vehicle 102 and is introduced into a straw chopper 130. The straw chopper 130 includes a chopping rotor 132 disposed inside a housing 134. A bank of stationary knives 136 extends upward through slots in the housing 134 to assist in chopping the MOG against blades that extend from the chopping rotor 132. An actuator 138 is coupled to the bank of stationary knives 136 to extend and withdraw the bank of stationary knives 136 from the housing 134 thereby controlling the degree to which the MOG is chopped.

Figure 2:
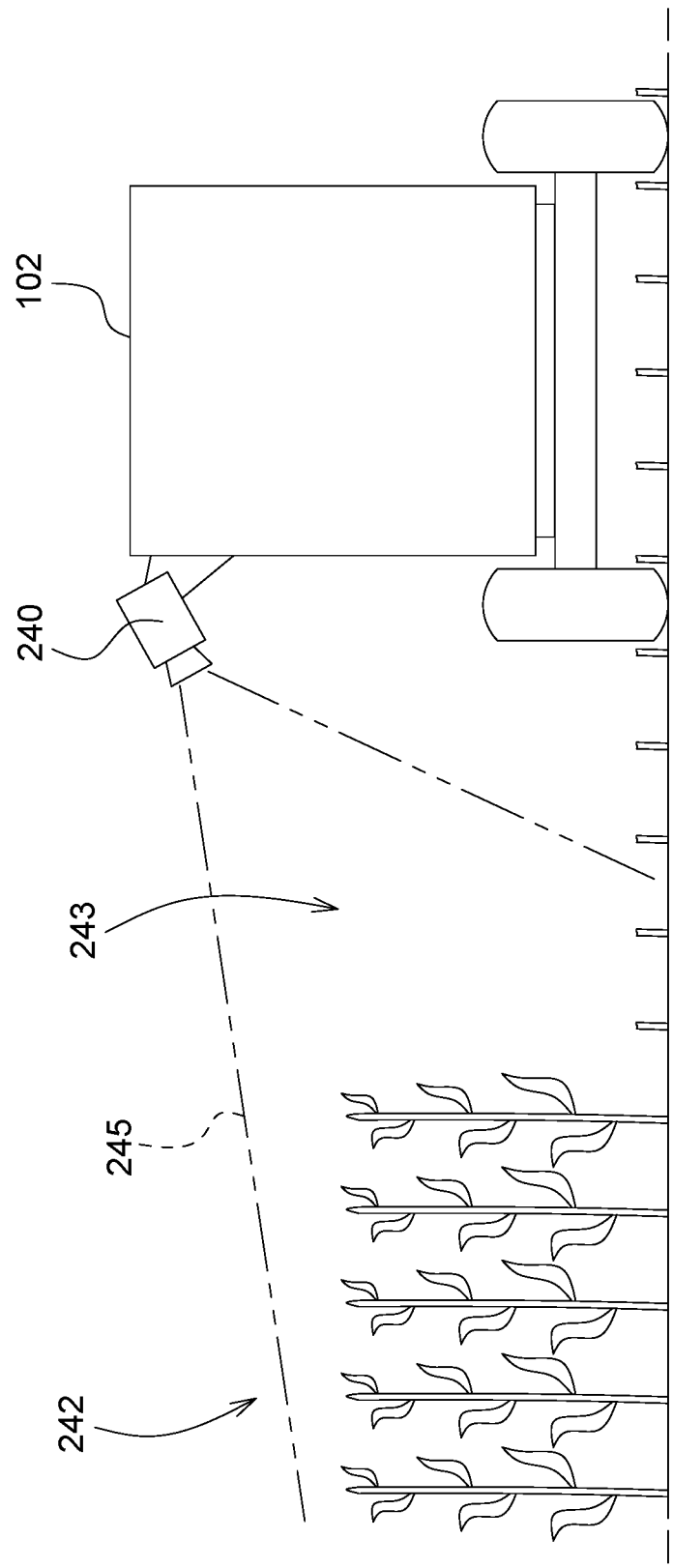
FIG. 2 is a front view of the agricultural harvester of FIG. 1 in an agricultural field.

Referring to FIG. 2, a sensor 240 is fixed to an upper portion of the agricultural harvesting vehicle 102. The sensor 240 is pointed transversely to one side of the agricultural harvesting vehicle 102 and toward a swath 242 of unharvested crop. The sensor 240 is also pointed toward a portion of the ground 243 that has been previously harvested by the agricultural harvesting vehicle 102. Both the unharvested crop and the portion of the ground 243 are within the field of view 245 of the sensor 240 and the sensor 240 is configured to generate signals indicative of the standing crop and generate signals indicative of the portion of the ground that has been previously harvested.

Figure 3:
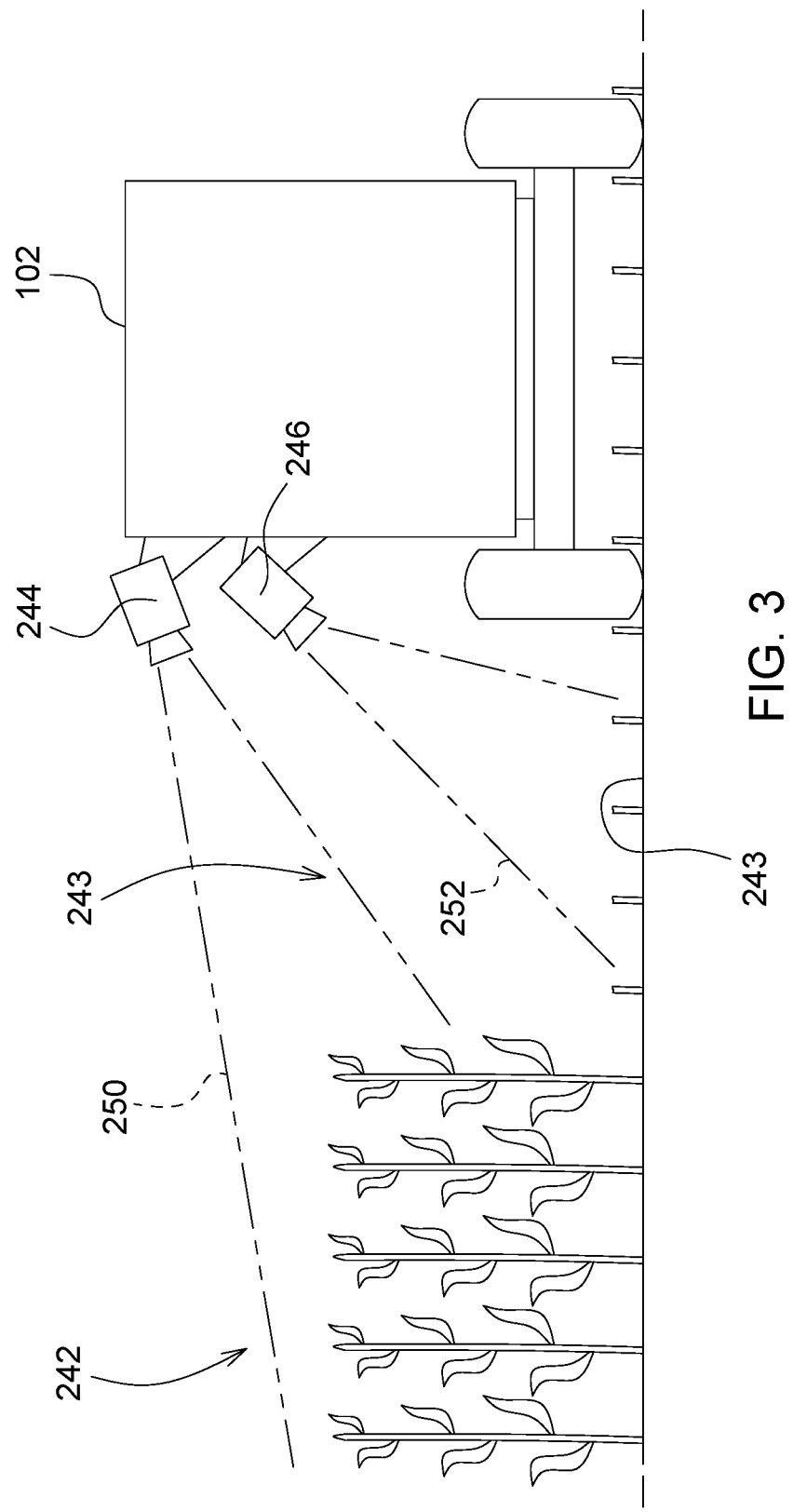
FIG. 3 is a front view of the agricultural harvester of FIG. 1 showing an alternative arrangement of biomass sensors.

Referring to FIG. 3, two sensors 244, 246 are fixed to an upper portion of the agricultural harvesting vehicle 102. The sensor 244 is pointed transversely to one side of the agricultural harvesting vehicle 102 and toward the swath 242 of unharvested crop. The sensor 246 is pointed toward the portion of the ground 243 that has been previously harvested by the agricultural harvesting vehicle 102. The swath 242 of unharvested crop is within the field of view 250 of the sensor 244. The portion of the ground 252 that has been previously harvested is within the field of view of the sensor 246.

In an alternative arrangement, a supplemental or alternative set of sensors 240 (FIG. 2), and/or sensors 244, 246 (FIG. 3) can be fixed to the opposite side of the agricultural harvesting vehicle 102 to similarly point at a swath of unharvested crop and a portion of previously harvested ground on the opposite side of the agricultural harvesting vehicle 102.

Each of the sensors 240, 244, 246 may comprise a two dimensional imaging device, a laser based device such as a LIDAR, a first emitting a frequency of energy absorbed by the plant mass, and a second radar emitting a frequency of energy that passes through the plant mass without being absorbed.

Figure 4:
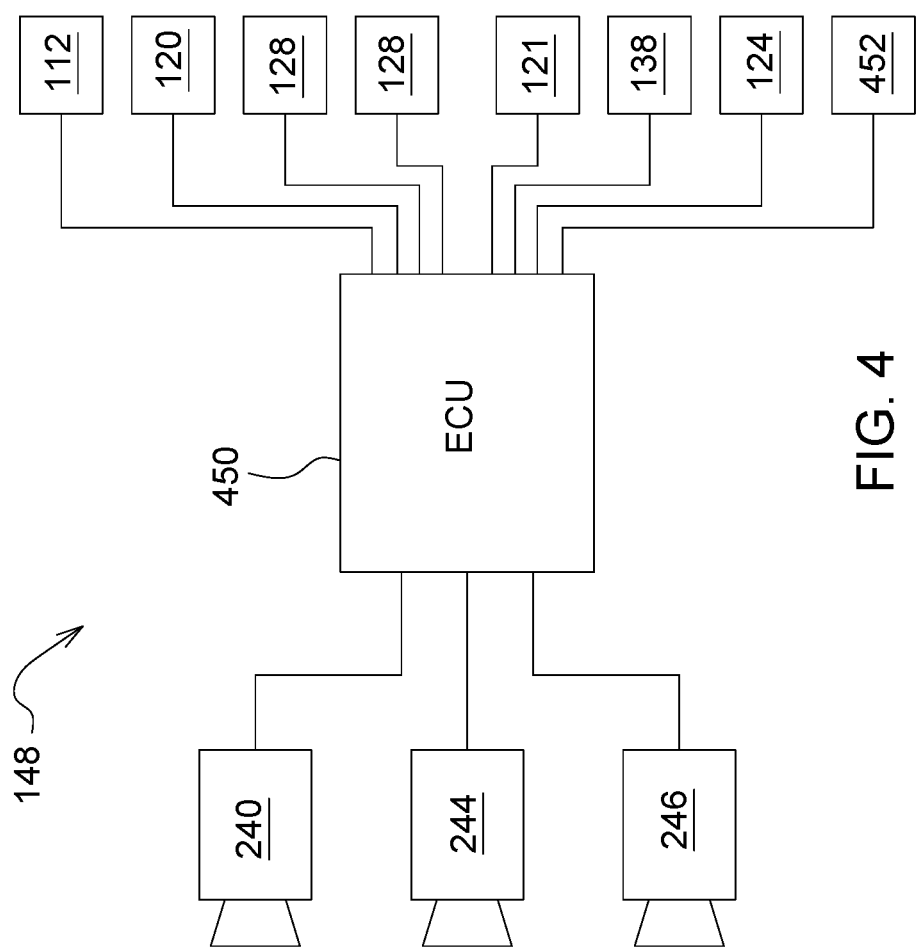
FIG. 4 is a schematic diagram of the biomass estimating system of FIGS. 2-3.

Referring to FIG. 4, a biomass estimating system for 48 includes a network of one or more electronic control units (this network is illustrated generally in FIG. 4 as ECU 450) coupled to the sensors 240, or (alternatively) sensors 244, 246.

The ECU 450 is coupled to the sensors 240, 244, 246 to receive electrical signals representative of the swath 242 of unharvested crop and the portion of the ground that is been previously harvested. The ECU 450 is configured to estimate the biomass in the swath 242 based upon both the sensed characteristics of the swath 242 and sensed characteristics of the previously harvested ground.

Figure 5:
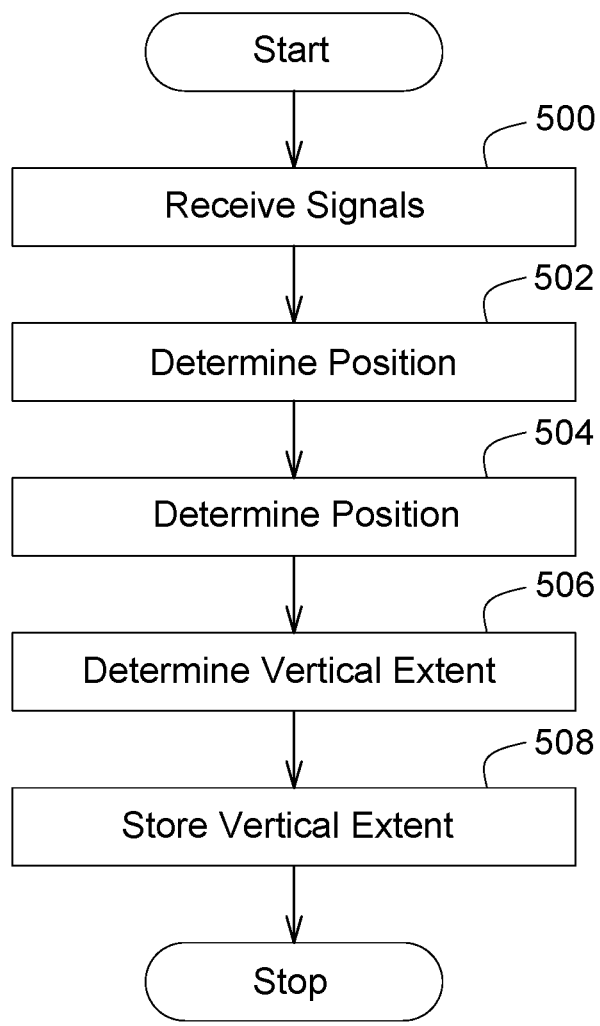
FIG. 5 is a flowchart showing the operation of the biomass estimating system of FIGS. 2-3.

The ECU 450 includes a digital microprocessor for performing programmed instructions described in conjunction with FIG. 5, a random access memory circuit for storing working values generated during the execution of the programmed instructions, a read-only memory circuit for storing the programmed instructions and other constant values, and signal conditioning circuits for converting the signals received from the sensors 240, 244, 246 into a form usable by the digital microprocessor.

Referring to FIG. 5, in step 500, the ECU 450 receives electrical signals from the sensors 240, 244, 246.

In step 502, the ECU 450 determines the vertical position of the ground based at least upon the portion of the signal received by the sensor 240 or 246 from the portion of previously harvested ground.

In step 504, the ECU 450 determines the vertical position of the top of the swath of unharvested crop 242 based at least upon the portion of the signal received by the sensor 240 or 244 from the swath of unharvested crop 242.

In step 506, the ECU determines the vertical extent of the swath of unharvested crop 242 by subtracting the vertical position of the ground (determined in step 502) from the vertical position of the top of the swath of unharvested crop 242 (determined in step 504).

In step 508, the ECU 450 stores the vertical extent of the swath of unharvested crop 242 in a memory circuit as an estimation of the biomass. This estimation is stored in conjunction with the corresponding two-dimensional location in the field where the biomass was sensed.

In step 510, the process stops.

The steps of FIG. 5 are automatically and programmatically repeated as the agricultural harvesting machine 102 traverses an agricultural field harvesting crops.

The steps in FIG. 5 permit the ECU 450 to build a two-dimensional biomass map of unharvested portions of the field. This two-dimensional biomass map can be later accessed by the ECU 450 when the agricultural harvesting vehicle 102 harvests a previously unharvested and mapped portion of the field.

Referring back to FIG. 4, the ECU 450 of the biomass estimating system 148 is drivingly coupled to the actuator 112 to programmatically lift and lower feederhouse on command of the ECU 450. The ECU 450 is also coupled to actuator 120 to programmatically increase and decrease the gap between the rotor and the concave. The ECU 450 is also coupled to the adjustable screens 124 to programmatically open and close the screens. The ECU 450 is also coupled to the cleaning fan 126 to programmatically increase and decrease the speed of the cleaning fan. The ECU 450 is also coupled to the motor and/or belt pulley arrangement of the chopper rotor 132 to programmatically increase and decrease the speed of the chopper rotor 132. The ECU 450 is also coupled to the actuator 138 to programmatically extend and retract the bank of stationary knives 136 with respect to the housing 134. The ECU 450 is also coupled to the variable speed drive for the rotor 116. The ECU 450 is also coupled to a navigation receiver 452 to receive signals indicating the position of the agricultural harvesting vehicle 102 and to determine the position of the agricultural harvesting vehicle 102 therefrom. The navigation receiver 452 is preferably a Glonass or GPS receiver configured to receive signals from one or more satellites.

Figure 6:
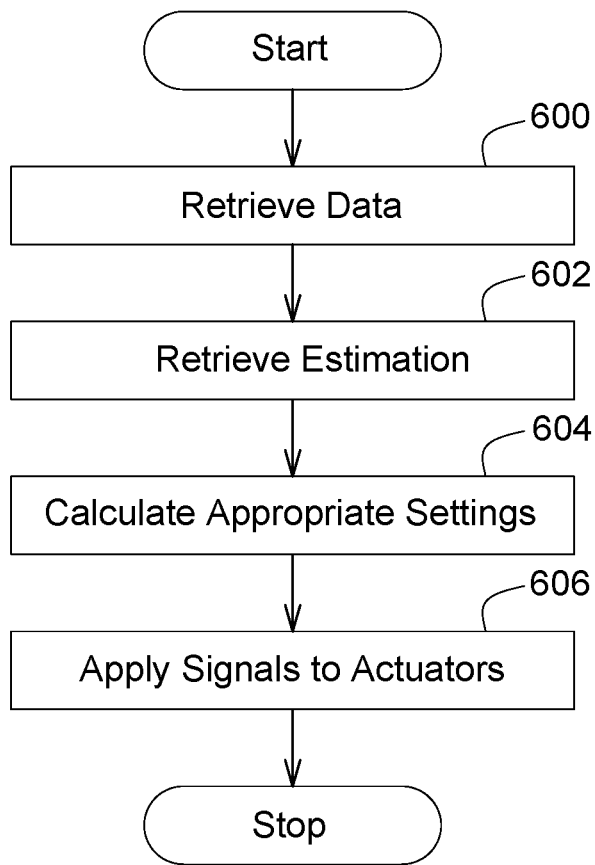
FIG. 6 is a flowchart showing the operation of the biomass estimating system of FIGS. 2-4 when applying the biomass estimate to change machine settings.

FIG. 6 illustrates another mode of operation of the ECU 450, as the agricultural harvesting vehicle 102 travels through the field harvesting crops.

In step 600, the ECU 450 retrieves data indicating the current location (or a location ahead of the current location in the direction of travel) of the agricultural harvesting vehicle 102 from the navigation receiver 452.

In step 602, the ECU 450 retrieves the estimation of biomass stored in the memory circuit of the ECU 450 corresponding to the location.

In step 604, the ECU 450 calculates appropriate settings of the height of the agricultural harvesting head 104, the rotor speed, the rotor/concave spacing, the cleaning fan speed, the chopper rotor speed, and the amount of extension of the bank of stationary knives 136 within the housing 134. The ECU 450 makes these calculations based at least upon the estimation of biomass calculated in step 508 and stored in the memory circuit of the ECU 450.

In step 606, after having calculated the appropriate settings, the ECU 450 applies signals to the actuators 112, the variable speed drive 121, the actuator 120, the motor driving the cleaning fan 126, the chopper rotor drive, and the actuator 138, respectively, that apply the settings to the agricultural harvester 102.

In step 608, the process stops.

The process of FIG. 6 is repeated automatically and repeatedly as the agricultural harvesting vehicle 102 travels through the field harvesting crops.

The claims below define the invention. The description and figures above are provided to enable one skilled in the art to make and use the invention. Other ways of making and using the invention will be apparent to those skilled in the art.

The invention claimed is:

1. A biomass estimating system for an agricultural harvesting vehicle operable in an agricultural field to harvest crops, the biomass estimating system comprising:
  a sensor arrangement directed laterally away from a side of the agricultural harvesting vehicle in a direction generally transverse to a direction of travel, wherein a stand of crop adjacent to the agricultural harvesting vehicle is within a field of view of at least one sensor, and wherein a portion of the ground previously harvested crop is also within the field of view; and
  an ECU coupled to the sensor arrangement, wherein the ECU is configured to receive signals indicating the stand of crop and the portion of the ground previously harvested,
  wherein the ECU is configured to calculate an estimated biomass for the portion of ground adjacent to the agricultural harvesting vehicle and having the stand of crop based upon the signals received from the stand of crop, and signals received from the portion of ground previously harvested, wherein for calculating the estimated biomass the ECU is configured to calculate a vertical extent of the stand of crop based on i) a vertical position of a top of the stand of crop and ii) a vertical position of the portion of the ground previously harvested, both of which are in the field of view of the at least one sensor.

2. The biomass estimating system of claim 1, wherein the at least one sensor comprises a first sensor that generates the signals indicating the stand of crop and the portion of the ground previously harvested.

3. The biomass estimating system of claim 1, wherein the at least one sensor comprises a first sensor coupled to the ECU that generates the signals indicating the stand of crop, and a second sensor coupled to the ECU that generates signals indicating the portion of ground previously harvested.

4. The biomass estimating system of claim 1, wherein the biomass estimating system is fixed to an upper portion of the agricultural harvesting vehicle.

5. The biomass estimating system of claim 1, wherein the ECU is configured to store the estimated biomass for the portion of ground adjacent to the agricultural harvesting vehicle in association with a location in the agricultural field of the portion of ground adjacent to the agricultural harvesting vehicle.

6. The biomass estimating system of claim 5, wherein the ECU is coupled to a navigation receiver to receive signals therefrom and to determine the location of the agricultural harvesting vehicle in the agricultural field.

7. The biomass estimating system of claim 6, wherein the ECU is configured to retrieve the previously stored estimated biomass when the navigation receiver indicates that the agricultural harvesting vehicle is facing the previously stored location in the agricultural field.

8. The biomass estimating system of claim 7, wherein the ECU is configured to calculate machine settings of the agricultural harvesting vehicle based at least upon the retrieved previously stored estimated biomass and to apply those machine settings to the agricultural harvesting vehicle, wherein the machine settings are automatically and repeatably applied to the agricultural harvesting vehicle to harvest crops as the agricultural harvesting vehicle travels through the agricultural field.

9. The biomass estimating system of claim 8, wherein the machine settings comprise a header height.

10. The biomass estimating system of claim 8, wherein the machine settings comprise a rotor speed.

11. The biomass estimating system of claim 8, wherein the machine settings comprise a cleaning fan speed.

12. The biomass estimating system of claim 8, wherein the machine settings comprise an adjustable screen setting.

13. The biomass estimating system of claim 8, wherein the machine settings comprise a speed of a straw chopper.

14. The biomass estimating system of claim 8, wherein the machine settings comprise a position of a stationary knife bank with respect to a straw chopper.

15. The biomass estimating system of claim 8, wherein the machine settings comprise a ground speed of the agricultural harvesting vehicle.

16. The biomass estimating system of claim 8, wherein the ECU comprises a network of electronic control units.

17. An agricultural harvesting vehicle with the biomass estimating system of claim 1 attached thereto.

* * * * *